United States Patent [19]

Schilling et al.

[11] Patent Number: 4,576,266
[45] Date of Patent: Mar. 18, 1986

[54] ROTATIONAL CONTROL APPARATUS

[75] Inventors: Hugh K. Schilling, St. Paul; Leonid Dayen, Blaine; Charles D. Raines, Plymouth, all of Minn.

[73] Assignee: Horton Manufacturing Co., Inc., Minneapolis, Minn.

[21] Appl. No.: 630,364

[22] Filed: Jul. 12, 1984

[51] Int. Cl.$^4$ ............... F16D 13/72; F16D 65/827
[52] U.S. Cl. ........................ 192/70.12; 192/113 A; 188/71.6; 188/264 A
[58] Field of Search ............. 192/70.12, 113 A; 188/71.6, 264 R, 264 A, 264 AA

[56] References Cited

U.S. PATENT DOCUMENTS

| | | | |
|---|---|---|---|
| 2,115,763 | 5/1938 | Burke | 192/113 A X |
| 2,238,943 | 4/1941 | McCune et al. | 188/264 A |
| 2,262,709 | 11/1941 | Lambert | 188/264 A |
| 2,369,328 | 2/1945 | Watts | 188/264 |
| 2,464,754 | 3/1949 | Tack | 188/218 |
| 2,621,762 | 12/1952 | Bachman | 188/264 A |
| 2,627,325 | 2/1953 | Helsten | 188/218 |
| 2,629,464 | 2/1953 | Helsten | 188/264 A |
| 2,728,422 | 12/1955 | Kelley | 188/264 |
| 2,771,966 | 11/1956 | Davey | 188/71.6 |
| 2,854,098 | 9/1958 | Griswold | 188/71.6 |
| 2,908,358 | 10/1959 | Erickson | 188/72 |
| 2,927,563 | 3/1960 | Geiger | 123/41.12 |
| 3,253,687 | 5/1966 | Young | 192/85 |
| 3,468,402 | 9/1969 | Edwards | 192/113 A X |
| 3,516,522 | 6/1970 | Chamberlain | 188/264 |

(List continued on next page.)

FOREIGN PATENT DOCUMENTS

| | | |
|---|---|---|
| 1575813 | 1/1970 | Fed. Rep. of Germany . |
| 1600100 | 1/1970 | Fed. Rep. of Germany . |
| 1600001 | 2/1970 | Fed. Rep. of Germany . |
| 2260155 | 6/1974 | Fed. Rep. of Germany . |
| 3107025 | 2/1982 | Fed. Rep. of Germany . |
| 3120104 | 4/1982 | Fed. Rep. of Germany . |
| 1371158 | 10/1974 | United Kingdom . |

OTHER PUBLICATIONS

Bulletin EB810-10 for Wichita Multi-Range Disc Brake, Model MRD (date unknown).
"Re-designed Air Cooled Brake Offers Wide Tension Control," Design Engineering, Mar. 1982, pp. 43, 44 (date of brake unknown).
Montalvo Tension Brakes & Slip Clutches Catalog (date unknown).
Tidland Air Brakes Catalog (date unknown).

Primary Examiner—Alan Cohan
Assistant Examiner—John A. Rivell
Attorney, Agent, or Firm—Peterson, Wicks, Nemer, & Kamrath

[57] ABSTRACT

A rotational control apparatus is shown according to the teachings of the present invention in its most preferred form as a brake. In the preferred embodiment, the apparatus includes an improved drive disc having an improved ventilated hub and an improved, ventilated friction disc slideably mounted thereon. The hub includes a generally cylindrical portion having axially extending cooling air bores extending therethrough and axially extending fins extending from the opposite axial ends thereof. The friction disc includes first and second, identical, interchangeable component discs interconnected together by columns projecting from the inner surface of the component discs which abut together and form radially extending fins having circumferentially aligned air passageways formed therein. Thus, air can flow through the air entry ports formed adjacent the center of the component discs radially between the component discs and also circumferentially through the air passageways allowing a mixing and turbulence of cooling air increasing friction disc heat transfer and cooling. In the preferred embodiment, the apparatus further includes a plurality of circumferentially spaced fins which interconnect the piston and the friction lining pressure plate and also aid in cooling. The axially extending fins of the hub direct and force air through the hub cooling air bores and between the pressure plate and piston to allow increased apparatus heat transfer and cooling.

24 Claims, 3 Drawing Figures

U.S. PATENT DOCUMENTS

| | | | |
|---|---|---|---|
| 3,592,298 | 7/1971 | Leffert et al. | 188/71.6 |
| 3,603,435 | 9/1971 | Buzzard et al. | 188/71.6 X |
| 3,623,577 | 11/1971 | Scharlack | 188/71.6 |
| 3,623,579 | 11/1971 | Hendrickson et al. | 188/71.6 X |
| 3,651,895 | 3/1972 | Whitfield | 188/71.6 |
| 3,667,581 | 6/1972 | Hanks | 192/113 A X |
| 3,805,935 | 4/1974 | Armstrong | 192/113 A |
| 3,862,678 | 1/1975 | Collins | 188/264 D X |
| 3,899,054 | 8/1975 | Huntress et al. | 192/113 A X |
| 3,986,586 | 10/1976 | Mauger et al. | 192/113 A |
| 4,013,146 | 3/1977 | Gebhardt et al. | 188/71.6 |
| 4,226,095 | 10/1980 | Loken | 192/70.2 X |
| 4,263,992 | 4/1981 | Moore et al. | 188/264 AA |
| 4,304,321 | 12/1981 | Wong | 192/85 T |
| 4,408,685 | 10/1983 | Schilling et al. | 192/85 A |
| 4,473,144 | 9/1984 | Allori | 192/70.12 |
| 4,474,268 | 10/1984 | Dayen | 188/71.6 X |

ROTATIONAL CONTROL APPARATUS

BACKGROUND

The present invention relates generally to rotational control apparatuses such as clutches or brakes, particularly to cooling such apparatus, also particularly to drive discs which may be utilized in such rotational control apparatuses, and to ventilated hubs and ventilated friction discs which can be utilized in drive discs of such rotational control apparatuses.

It is a continuous problem to provide clutches or brakes which are efficient, and which have high ability to transfer the heat energy generated in the engagement process and/or in a constant slipping arrangement. The ability to transfer heat energy is especially desired in drive discs utilized in rotational control apparatuses where force must be transferred through the drive disc rather than just the outside of the drive disc. Further, the ability to thermally insulate the piston from the pressure plate in a simple, economic manner is also highly desired in rotational control apparatuses.

SUMMARY

The present invention solves these and other problems by providing an improved rotational control apparatus having several improved components which allow improved thermal transfer and insulation.

Specifically, the present invention solves these and other problems by providing an improved ventilated friction disc including first and second individual component discs interconnected together. Internal heat radiating fins are provided extending generally longitudinally internally of the interconnected component discs and extending radially from the center of the friction disc to the periphery in a circumferentially spaced relation throughout the circumference of the friction disc to thus divide the friction disc into wedge shaped areas. Cooling entry ports are formed through the spaced component discs adjacent the hub in the wedge shaped areas. The heat radiating fins include at least three columns in radially spaced relation forming fin openings therebetween. An air cooling chamber is then defined internally of the friction disc between the air entry port, through the fin openings of the heat radiating fins, and out of the periphery of the friction disc to allow a serpentine path and passage of cooling air radially and also circumferentially between the first and second component discs to allow increased heat transfer, cooling, and device efficiency.

Additionally, the present invention solves these and other problems by providing an improved ventilated hub including a generally cylindrical portion having axially extending cooling air bores extending therethrough. Axially extending fins are provided extending from an axial end of the generally cylindrical portion and located between and out of circumferential alignment with the axially air cooling bores. Therefore, the axially extending fins of the hub direct and force air through the axially extending bores to allow increased hub heat transfer, cooling, and device efficiency.

Furthermore, the present invention solves these and other problems by providing an improved method of thermally insulating the pressure plate and the piston. Circumferentially spaced fins are provided which interconnect the piston and the pressure plate in a spaced relation allowing cooling air to pass therebetween and around the circumferentially spaced fins.

Also, the present invention provides a staggered O-ring design for sealing the piston within the piston cavity to provide a simple design while overcoming sealing problems previously experienced by prior rotational control apparatuses.

It is thus an object of the present invention to provide a novel rotational control apparatus.

It is further an object of the present invention to provide a novel friction disc.

It is further an object of the present invention to provide a novel ventilated hub.

It is further an object of the present invention to provide a novel method of thermally insulating the pressure plate and the piston.

It is further an object of the present invention to provide such novel rotational control apparatus, friction disc, and hub which have increased heat transfer characteristics.

It is further an object of the present invention to provide such novel rotational control apparatus, friction disc, and hub which have increased overall cooling characteristics.

It is further an object of the present invention to provide a novel axially, staggered O-ring design for sealing the piston within the piston cavity.

It is further an object of the present invention to provide such novel rotational control apparatus, friction disc, and hub which are simple in design and which can easily be manufactured and assembled.

It is further an object of the present invention to provide such novel rotational control apparatus, friction disc, and hub allowing a simplified casting.

It is further an object of the present invention to provide such novel friction disc allowing a dramatically simplified casting over previously known internal cavity friction discs.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 3 shows a partial, cross-sectional view of the apparatus of FIG. 1 according to the section line of 3—3 of FIG. 1.

Figure 1:
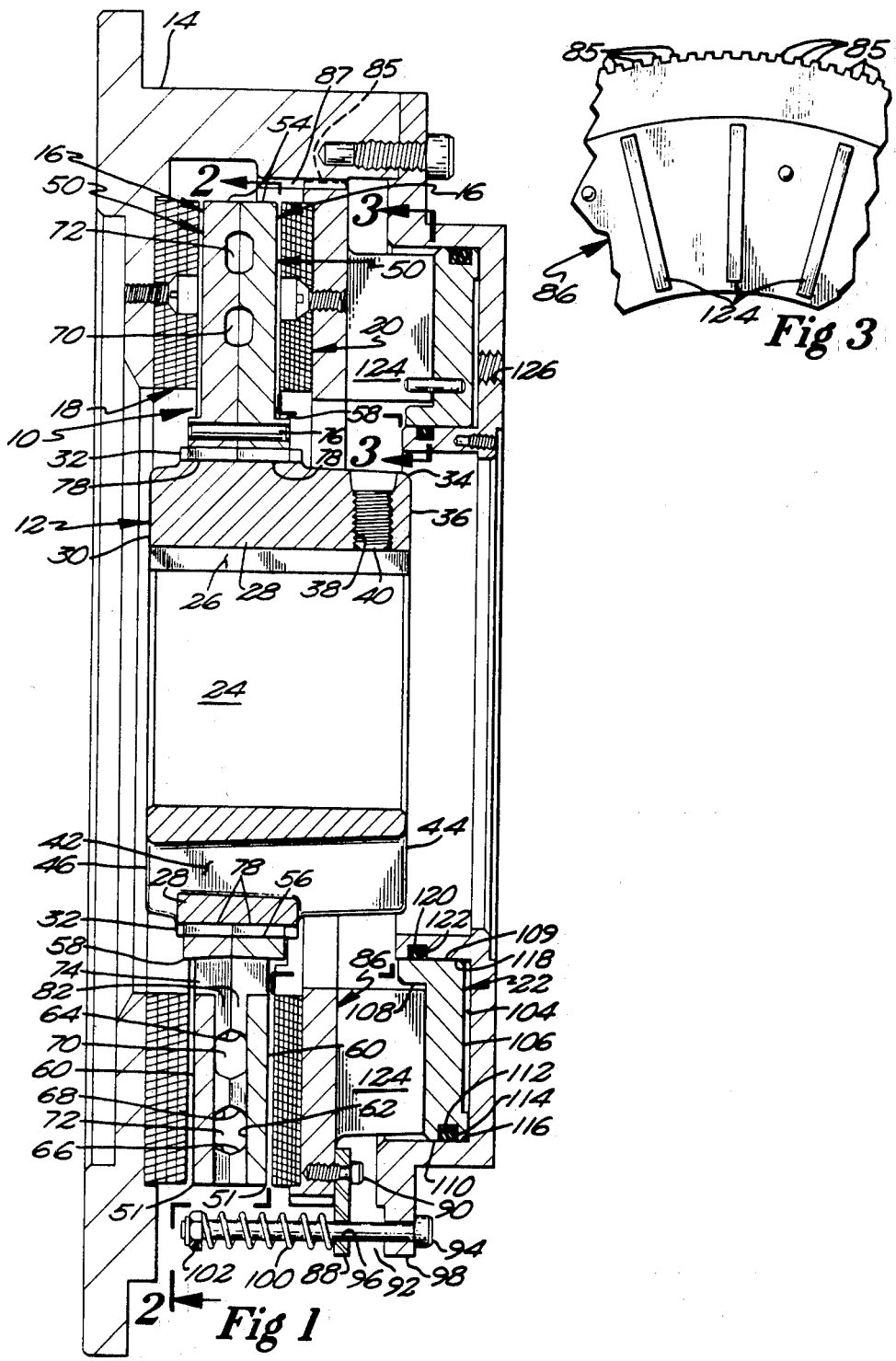
FIG. 1 shows a partial cross-sectional view of a rotational control apparatus according to the teachings of the preferred embodiment of the present invention.
Figure 2:
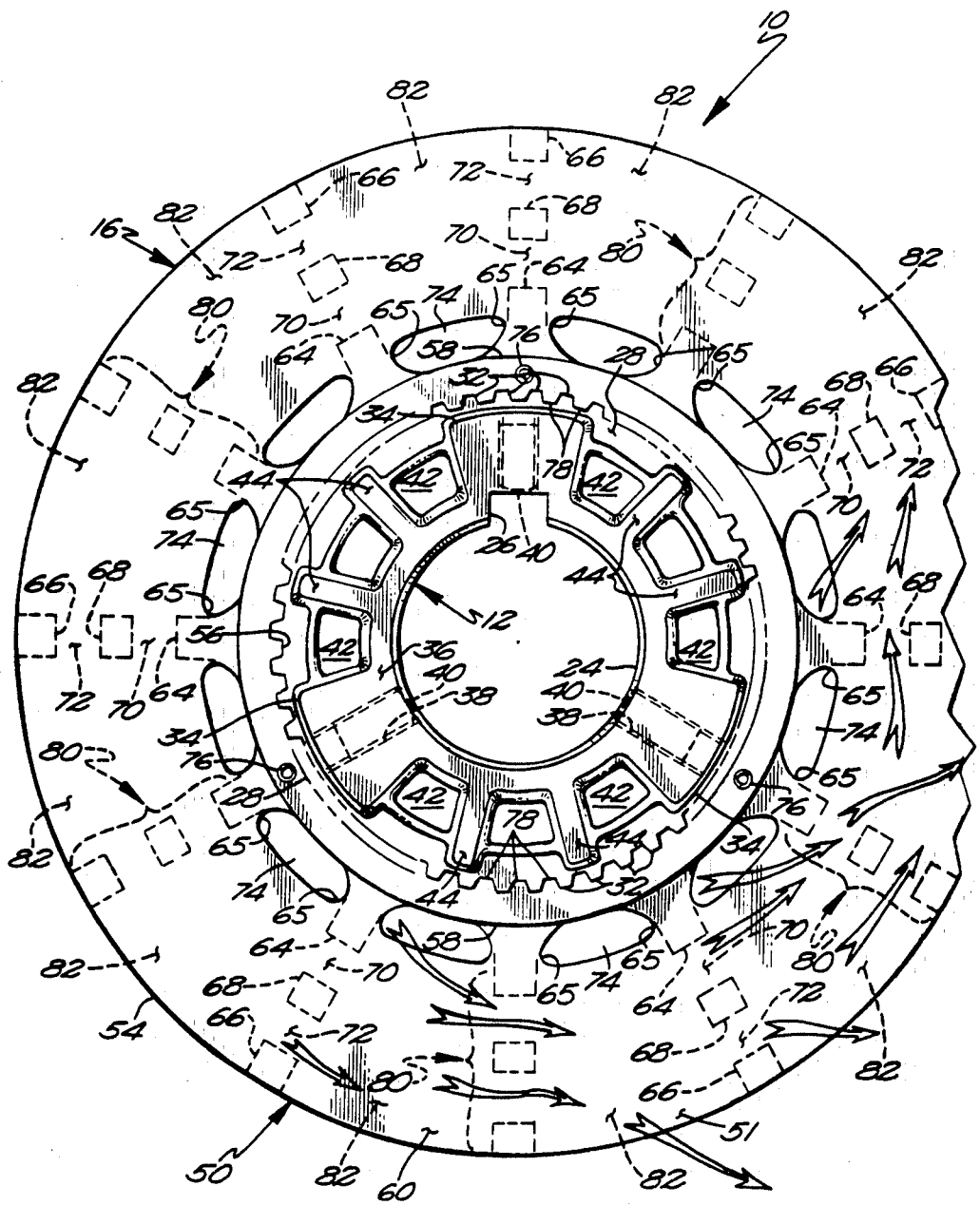
FIG. 2 shows a partial, cross-sectional view of the apparatus of FIG. 1 according to section line 2—2 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

In the Figures, an apparatus for rotational control is shown in its preferred form as a brake and is generally designated 10. In its preferred form, brake 10 includes a hub 12 for rotation within a housing 14. Hub 12 generally includes an axially extending bore 24 for receiving a shaft, not specifically shown, to be braked in the most preferred form. To insure that relative rotation does not occur between the shaft and hub 12, suitable keyway means 26 may be provided.

In the preferred embodiment, brake 10 includes a friction disc 16 slideably mounted upon hub 12. Hub 12 and disc 16 form a drive disc of brake 10 of the present invention. Disc 16 can be releasably captured between first and second friction linings 18 and 20 as in the present invention. In its most preferred form, friction lining 18 is mounted to housing 14. Friction lining 20 is mounted to a circular pressure plate 86. Pressure plate 86 is mounted for non-rotatable, axial movement with respect to housing 14 by splines 85 formed on the outer periphery of plate 86 which slideably engage with splines 87 formed in housing 14. Pressure plate 86 includes radial arms 88 secured thereto by bolts 90 and which extend from plate 86 into circumferentially spaced, axially extending apertures 92 formed in housing 14. Bolts 94 are provided in the preferred embodiment which extend through axially extending apertures 96 formed in arms 88 and which are anchored by ears 98 formed in housing 14 within apertures 92. Pressure plate 86 is biased in a direction away from friction disc 16 by springs 100 located between nuts 102 and arms 88.

Housing 14 further includes an annular cavity 104 for the reciprocal receipt of a piston 22. Piston 22 has an annular body portion 106 having a shape complementary to and for receipt within cavity 104. In its most preferred form, piston 22 is L-shaped and includes an axially extending leg portion 108 located at and contiguous with the radial inward edge 109 of body portion 106. The radial outward edge 110 of body portion 106 includes a cavity 112 for receipt of an O-ring 114 for sealing engagement with the radial outward edge 116 of cavity 104. The radial inward edge 118 of cavity 104 includes a cavity 120 for receipt of an O-ring 122 for sealing engagement with the radial inward edge 109 of leg portion 108 and body portion 106 of piston 22. In its most preferred form, O-ring 122 is located axially inward towards friction disc 16 of O-ring 114 when piston 22 is located axially within cavity 104.

To interconnect piston 22 and pressure plate 86 in a spaced relation, axially extending, circumferentially spaced fins 124 are provided extending and captured between piston 22 and plate 86. In its most preferred form, fins 124 are cast with pressure plate 86 and abut with body portion 106 of piston 22. Due to the biasing of plate 86 by springs 100, plate 86 and fins 124 are biased against piston 22 which in turn is biased into cavity 104.

Suitable provisions 126 are provided for introducing air pressure within cavity 104. Therefore, when pressurized air is supplied to cavity 104, piston 22 reciprocates within cavity 104 against the bias of springs 100 and moves friction lining 20 to engage with friction disc 16 sliding friction disc 16 on hub 12 until it engages with friction lining 18. Since friction disc 16 is then captured between friction linings 18 and 20, braking power is then applied to friction disc 16 and thus to hub 12.

It should then be realized that other types of construction of rotational control apparatuses other than brake 10 shown in the most preferred form of the present invention can be utilized with the improved hub 12 and friction disc 16 of the present invention; however, hub 12 and disc 16 have been found to be particularly advantageous with brake 10 as shown.

Hub 12 includes a generally cylindrical portion 28 which is axially spaced from the first end 30 of hub 12. Located on the exterior of cylindrical portion 28 are splines 32 for the slideable receipt of friction disc 16. Shoulders 34 are also included on hub 12, for example, at the 120 degree/240 degree/360 degree circumferential points, and extend axially from cylindrical portion 28 to end 36 of hub 12. It should then be noted that the thickness of shoulders 34 decreases along their axial length from cylindrical portion 28 to end 36. Radially extending threaded bores 38 are provided in shoulders 34 for receiving set screws 40 for purposes of abutting with the shaft located in bore 24 of hub 12. In its most preferred form, one of bores 38 is in radial alignment with the keyway means 26 such that set screw 40 engages with keyway means 26.

Hub 12 further includes axially extending bores 42 which extend through cylindrical portion 28 and are located between shoulders 34. In its most preferred form, three bores 42 are located between each adjacent shoulder 34 such that a total of nine bores 42 are provided. Located between bores 42 and between shoulders 34 and out of circumferential alignment with bores 42 are axially extending radial fins 44 which extend axially from cylindrical portion 28 to end 36 of hub 12. The axial thickness of fins 44 decrease from cylindrical portion 28 to end 36 of hub 12. It should further be appreciated that the radial extent of shoulders 34 and fins 44 are equal, is less than the radial extent of cylindrical portion 28, and decreases slightly from cylindrical portion 28 to end 36 of hub 12. In its most preferred form, bores 42 have a radial size which increases over their axial length from end 30 to end 36 of hub 12. Hub 12 further includes radially extending fins 46 extending axially from cylindrical portion 28 to end 30 of hub 12. Fins 46 are in axial alignment with shoulders 34 and fins 44.

Brake friction disc 16 of the preferred embodiment is shown in the form of two single sided, similarly configured, identical, interchangeable, component discs 50. Discs 50 have an outer edge or periphery 54 and an inner circumference or edge 56. Discs 50 generally include a flat, plate-like, annular member 51 having first and second sides 60 and 62, respectively. Adjacent inner edge 56 and the center of disc 50 is formed an integral ring 58 of material having a thickness greater than annular member 51. Ring 58 extends axially beyond first side 60 and also beyond side 62 of annular member 51. In its most preferred form, sides 60 of the first and second component discs 50 of disc 16 provide friction engagement surfaces for linings 18 and 20 of brake 10.

Integrally formed with ring 58 are radially extending tongues or columns 64 located on side 62 of annular member 51. In its most preferred form, tongues 64 are located every 30 degrees around annular member 51. Further provided are columns 66 located on periphery 54 of annular member 51 and in radial alignment with tongues 64. Columns 68 are further provided on side 62 of annular member 51 located radially in line and intermediate tongue 64 and column 66. In its most preferred form, tongues 64 are cirrcumferentially aligned and have the same radial extent around discs 50. Likewise, columns 66 are circumferentially aligned and have the same radial extent around discs 50. Additionally, columns 68 are circumferentially aligned and have the same radial extent around discs 50. This circumferentially aligned relation of tongues 64 and columns 66 and 68 encourage circumferential cooling air movement rather than radial air movement to increase cooling air residence time, the benefits of which will be set forth hereinafter.

To form friction disc 16, first and second component discs 50 are obtained and are positioned such that sides 62 face each other and sides 60 are located on opposite sides thereof. At that time, tongues 64 and columns 66 and 68 of the adjacent disc 50 abut and may be aligned with each other. Suitable pins 76 may then be provided extending through rings 58 for attaching the first and second discs 50 together to form the friction disc 16. Suitable splines 78 can further be provided in the inner circumference 56 of ring 58 for slideable receipt on splines 32 of hub 12.

It can then be appreciated that air passageways or fin openings 70 and 72 are formed between tongues 64 and column 68 and between column 66 and column 68, respectively. Due to the circumferential alignment and the same radial extent of tongues 64 and columns 66 and 68, obstruction free annular air paths around the entire circumference of disc 16 are formed at the radial distances of fin openings 70 and 72. Axially extending apertures or air ports 74 are further provided in annular member 51 radially inwardly of ring 58 and located and extending between tongues 64. The axial thickness of tongues 64 and columns 66 and 68 is equal to the axial thickness of ring 58 extending beyond side 62 of annular member 51.

A cooling cavity is then formed between intake ports 74 formed adjacent the center of friction disc 16 between the inner surfaces 62 of the first and second component discs 50 of friction disc 16 and periphery 54 of component discs 50. As friction disc 16 is rotated about its axis, air can enter the air cooling chamber formed, as described above, through apertures 74 and pass through the air cooling chamber radially between the first and second component discs 50 and circumferentially through air passageways 70 and 72 formed between tongues 64 and columns 66 and 68, and thus by serpentine paths, past the peripheries 54 of the first and second component discs 50 and to the atmosphere to allow increased heat transfer, cooling, and efficiency of friction disc 16.

Tongues 64 and columns 66 and 68 of disc 50 form radially extending heat radiating fins 80 circumferentially spaced throughout the circumference of the friction disc 16. Fins 80 then define wedge shaped volumes 82 defined by sides 62 of the first and second component discs 50 forming disc 16 and by adjacent fins 80. Volumes 82 are free and devoid of any obstructions such as cooling fins or the like. Specifically, sides 62 of discs 50 are smooth between fins 80 defined by tongues 64 and columns 66 and 68. No obstructions are present within volumes 82 to encourage air passage through the cooling cavity radially to the atmosphere, but rather the air is encouraged to travel circumferentially through air passageways 70 and 72 of the cooling cavity increasing residence time of cooling air within disc 16. Thus, although the overall cooling area is less than if cooling fins or other heat transferring obstructions were provided in volumes 82, the overall cooling is improved due to the increased residence time of the cooling air in disc 16. Thus, when the increased strength of friction disc 16 having abutting radial support is desired such as in brake 10 of the preferred embodiment of the present invention, the construction of friction disc 16 as shown and described has been found to achieve greater heat dissipation.

It can also be appreciated that due to their touching or abutting relation, tongues 64 and columns 66 and 68 provide a strong interconnection such that annular members 51 of discs 50 remain parallel to each other in friction disc 16 and do not in any way move together, especially when friction 16 is captured between friction linings 18 and 20 as in the preferred embodiment of brake 10 of the present invention. Friction disc 16 of the present invention can then be utilized in any type of rotational control apparatus including those where force must be transmitted through the component discs 50 rather than just the outside of the component discs 50.

With the foregoing, subtleties and novel differences of friction disc 16 of the present invention can be explained and understood. With fins 80 and the serpentined, radial and circumferential path described, an increased surface cooling area is used to thereby increase the cooling efficiency of friction disc 16 and of brake 10 in which disc 16 is utilized. Further, it will now be appreciated that cooling air entering friction disc 16 adjacent hub 12 and through cooling ports 74 can then move through friction disc 16 not only radially, as has been accomplished in known prior friction discs, but also 360 degrees circumferentially as illustrated in the drawings. This combination of a radial and circumferential movement of cooling air then also allows a mixing and turbulence which has also been found to increase efficiency. It has then been found that the present design takes advantage of a higher proportion of the theoretical cooling area available, increases residence time of cooling air versus cooling surfaces, and operates by conduction and convection rather than by conduction alone. Further, it has been found that the faster hub 12 rotates, the more braking power may be required. It has further been found that the faster hub 12 and friction disc 16 rotate, the more heat dissipation is achieved by the design of the present invention at least through an increased turbulence.

It should also be realized that friction disc 16 constructed according to the teachings of the present invention obtains several advantages. Specifically, the use of two single sided component discs 50 having extrusions extending perpendicularly from one side 62 of the disc 50 allows a dramatically simplified casting over previously known internal cavity discs. Likewise, since component discs 50 are of identical construction, a single mold is required to produce friction disc 16, and the parts required for inventory either in assembling the present friction disc 16 or for replacement parts therefor is reduced since only a single component is required.

Additionally, tongues 64 and air ports 74 have a particularly advantageous shape and interrelationship to enhance entry of the cooling air into the cooling cavity of friction disc 16 through ports 74. Specifically, tongues 64 are generally rectangular in shape but have rounded corners 65 at their interconnection to ring 58. Likewise, ports 74 are elongated in shape extending between tongues 64 and have an inner radial shape that follows the contour of corners 65 of tongues 64 and of ring 58. Thus, air catching or stopping areas are not formed by tongues 64 and ports 74 and entry of the cooling air is enhanced.

Likewise, hub 12 of the present invention has been found to be particularly advantageous in cooling hub 12 and thus brake 10. Air passage through bores 42 provides cooling to hub 12 by conduction and convection rather than conduction alone. With fins 44 and 46, shoulders 34, and bores 42, an increased surface cooling area is used to thereby increase the cooling efficiency of hub 12 and of brake 10 in which hub 12 is utilized. Additionally, bores 42 allow better entry of cooling air internally of brake 10 to cool other components of brake 10 such as component discs 50, friction lining 20, and other internal brake components. Further, it has been found that the faster hub 12 rotates, the more heat dissipation is achieved by the design of the present invention at least through an increased air flow or rotational windage.

Similarly, it is well-known that it is desireable to thermally insulate between the piston and the pressure plate to allow the piston to be cooler than the pressure plate to preserve the O-rings or other seals and reduce thermal transfer to the hydraulic medium. Prior known control apparatuses utilized a plastic piece located between the pressure plate and the piston to provide such thermal insulation, thus requiring an extra part and extra assembly. However, the present invention utilizes fins 124 to simultaneously provide the thermal insulation to obtain a temperature differential between the piston and pressure plate and separate the piston and the pressure plate physically. Furthermore, in the preferred form, fins 124 may be cast as a unitary piece with the piston or as in the most preferred form with the pressure plate to reduce the cost of manufacture and assembly.

Additionally, fins 124 allow the entry of cooling air between piston 22 and pressure plate 86 and increase the surface cooling area to thereby increase the cooling efficiency of pressure plate 86 and to increase the temperature difference between pressure plate 86 and piston 22. Furthermore, it should be appreciated that the combination of ventilated hub 12 and fins 124 of the present invention is particularly advantageous for increasing internal air flow and overall apparatus cooling. Specifically, after air exits through bores 42 and hub 12, fins 44 fan the air radially outwardly through, around, and between fins 124 and through apertures 92 of housing 14.

Additionally, the present invention includes a novel staggered O-ring piston sealing method. Specifically, large diameter O-rings have a tendency to sag out of their cavities if the cavities are located in an interior or inside surface. In annular-shaped pistons as in the present invention, sealing means must be provided between the radial outward surface and the radial internal surface of the piston and the piston cavity. Thus, if an O-ring were positioned within the internal surface, it would tend to sag as set forth hereinbefore. In the preferred embodiment, O-ring 122 is located within cavity 120 of edge 118 of cavity 104 and thus is located on an outside surface to avoid the sag tendency of inside surface O-rings. It can then be appreciated that placement of O-ring 122 in cavity 104 is of critical importance for allowing the reciprocation of piston 22 through a large travel distance while maintaining sealing engagement at all times. The axially staggered O-ring positions as shown in the drawings with O-ring 122 located axially inwards of O-ring 114 towards friction disc 16 meets these placement requirements. Furthermore, to reduce the overall axial length of piston 22 allowing a more compact design, leg portion 108 is provided in the preferred embodiment to allow large travel distance and maintain sealing engagement while utilizing a piston 22 having a relatively small axial length.

Now that the basic teachings of the present invention have been explained, many extensions and variations will be obvious to one having ordinary skill in the art. For example, as set forth hereinbefore, friction disc 16 and hub 12 can be utilized in other rotational control environments than brake 10 of the most preferred form of the present invention. Their adaptation in other environments will be within the skill of the art after the teachings of the present invention become known.

Likewise, friction disc 16 and hub 12 of the present invention are both believed to be advantageous and their combination is believed to be particularly advantageous. However, improved disc 16 and improved hub 12 can be utilized separately or in a different combination. For example, disc 16 could be secured to or formed integrally with hub 12 in a non-sliding relation.

Furthermore, the number of columns of friction disc 16 desired depends on the diameter of friction disc 16 and the desireable air passage. Thus, more or fewer columns can be utilized according to the teachings of the present invention than as described in reference to the preferred embodiment of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Drive disc comprising, in combination: a ventilated hub comprising, in combination: a generally cylindrical portion having a first end and a second end; axially extending air cooling bores extending through the cylindrical portion; axially extending fins extending from the second end of the cylindrical portion and located between and out of circumferential alignment with the axially extending air cooling bores, with the axially extending fins of the hub having a decreasing radial size and a decreasing axial thickness in a direction extending away from the cylindrical portion, with the axially extending air cooling bores having a decreasing radial size over its axial length from the second end of the cylindrical portion to the first end of the cylindrical portion; and axially extending shoulders extending from the second end of the cylindrical portion, with the axially extending bores and the axially extending fins being located between and out of circumferential alignment with the axially extending shoulders, and radially extending threaded bores formed in the axially extending shoulders for receiving set screws for abutting with a shaft to be connected to the hub; and an improved ventilated friction disc interconnected to the hub, with the friction disc comprising, in combination: a first individual component disc, a second, individual component disc, means for interconnecting the first and second component discs together to form the friction disc, heat radiating fins extending generally longitudinally between the internal surfaces of the component disc and internally of the friction disc, with the heat radiating fins extending radially from the hub in a circumferentially spaced relation throughout the circumference of the friction disc to thus divide the friction disc into wedge shaped areas, at least one cooling air entry port formed through the component disc adjacent the hub and located in the wedge shaped areas, with the heat radiating fins including at least three columns in a spaced relation forming fin openings therebetween to define an air cooling chamber internally of the friction disc, between the air entry port, through the fin openings of the heat radiating fins, and out of the periphery of the friction disc to allow passage of cooling air radially and also circumferentially inside the friction disc to allow increased heat transfer, cooling, and apparatus efficiency, with the fin openings being in circumferential alignment to form an obstruction free annular air path around the entire circumference of the friction disc.

2. The drive disc of claim 1 further comprising, in combination: means for rotatably relating and slideably mounting the friction disc on the hub comprising, in combination a central opening formed in the component discs of the friction disc; splines formed within the central opening of the component discs; and splines formed on the generally cylindrical portion of the hub for intermeshing with and for receipt within the splines of the component discs.

3. The drive disc of claim 1 further comprising, in combination: axially extending fins extending from the first end of the cylindrical portion and located between and out of circumferential alignment with the axially air cooling bores of the hub and in circumferential alignment with the axially extending fins extending from the second end of the cylindrical portion.

4. The drive disc of claim 1 wherein the component discs include a central, integrally formed ring having an axial length beyond the surface from which the heat radiating fins extend equal to the length of the heat radiating fins; wherein the radially inward columns are integrally formed with the ring and include rounded corners at their interconnection; and wherein the cooling air entry port has an elongated shape extending between circumferentially adjacent columns and having a shape which follows the contour of the ring and the rounded corners of the columns to enhance entry of the cooling air into the cooling air entry port.

5. The disc drive of claim 1 wherein the first and second individual component discs are of an identical and interchangeable construction.

6. In a brake or clutch device having a device housing and arranged for providing rotational control between the device housing and a hub to be connected to a shaft, a device friction disc interconnected to the hub, and at least one controlled friction engagement surface mounted with respect to the device housing and arranged to frictionally engage with the friction disc to thereby controllably apply power between the device housing and the rotating shaft, the improvement comprising the friction disc arranged longitudinally along the hub, radially around the hub, operationally to the hub, and longitudinally internally of the device, and including internal heat radiating fins, with the heat radiating finned longitudinally internally located friction disc comprising a first, individual component disc; a second, individual component disc; means for interconnecting the first and second component discs together to form the friction disc, with the heat radiating fins extending generally longitudinally between the internal surfaces of the component discs and internally of the friction disc, with the heat radiating fins extending radially from the hub in a circumferentially spaced relation throughout the circumference of the friction disc to thus divide the friction disc into wedge shaped areas, at least one cooling air entry port formed through the spaced component discs adjacent the hub and being formed in the wedge shaped areas, with the heat radiating fins including at least three columns in a spaced relation forming fin openings therebetween to define an air cooling chamber internally of the friction disc, between the air entry port, through the fin openings of the heat radiating fins, and out of the periphery of the friction disc to allow a serpentine path and passage of cooling air radially and also circumferentially inside the friction disc to allow increased heat transfer, cooling, and device efficiency and yet allow force from the frictionally engagement of the device friction disc and the controlled friction engagement surface to be transferred through the friction disc rather than just along the outside of the device friction disc.

7. The device of claim 6 wherein the improvement further comprises a ventilated hub comprising, in combination: a generally cylindrical portion having a first end and a second end; axially extending air cooling bores extending through the cylindrical portion; axially extending fins extending from the second end of the cylindrical portion and located between and out of circumferential alignment with the axially extending air cooling bores.

8. The device of claim 7 wherein the axially extending fins of the hub have a decreasing radial size and a decreasing axial thickness in a direction extending away from the cylindrical portion.

9. The device of claim 7 wherein the axially extending air cooling bores have a radial size which decreases over its axial length from the second end of the cylindrical portion to the first end of the cylindrical portion.

10. The device of claim 7 further comprising, in combination: means for rotatably relating and slideably mounting the friction disc on the hub comprising splines formed on the generally cylindrical portion of the hub; and complementary splines formed on the component discs of the friction disc for intermeshing with the splines of the hub.

11. The device of claim 7 further comprising, in combination: axially extending fins extending from the first end of the cylindrical portion and located between and out of circumferential alignment with the axially extending air cooling bores of the hub and in circumferential alignment with the axially extending fins extending from the second end of the cylindrical portion.

12. The device of claim 7 further comprising, in combination: axially extending shoulders extending from the second end of the cylindrical portion, with the axially extending bores and the axially extending fins being located between and out of circumferential alignment with the axially extending shoulders, and radially extending threaded bores formed in the axially extending shoulders for receiving set screws for abutting with the shaft connected to the hub.

13. The device of claim 6 further comprising, in combination: means for rotatably relating and slideably mounting the friction disc on the hub.

14. The device of claim 6 wherein the component discs include a central, integrally formed ring having an axial length beyond the surface from which the heat radiating fins extend equal to the length of the heat radiating fins; wherein the radially inward column is integrally formed with the ring and includes rounded corners at their interconnection; and wherein the cooling air entry port has an elongated shape extending between circumferentially adjacent columns and having a shape which follows the periphery of the ring and the rounded corners of the columns to enhance entry of the cooling air into the cooling air entry port.

15. The device of claim 6 wherein the first and second individual component discs are of an identical and interchangeable construction.

16. Rotational control apparatus comprising, in combination: an apparatus housing; a piston reciprocally received within a piston cavity formed in the apparatus housing; means for supplying fluid pressure within the piston cavity behind the piston; a pressure plate; means for slideably mounting the pressure plate with respect to the apparatus housing; a drive disc; with the pressure plate and drive disc including frictional engaging means for frictionally interrelating the pressure plate and drive disc; means for interconnecting the pressure plate and the piston in a spaced relation and for thermally insulating the pressure plate and the piston; means for biasing the piston into the piston cavity; with the interconnecting and thermally insulating means comprising fins integrally formed with the pressure plate and abutting with the piston, with the fins having a thickness, a radial length, and an axial length, with the fins being provided at a multiplicity of circumferentially spaced locations allowing entry of cooling air between the piston and the pressure plate for passage around and between the fins, with the radial length and the axial length of the fins being significantly larger than the thickness of the fins and with the thickness of the fins being minor in relation to the radial length and the axial length of the fins for increasing the surface cooling area of the fins, with the axially extending, circumferentially spaced fins extending between the piston and the pressure plate increasing the cooling efficiency of the pressure plate and increasing the temperature difference between the pressure plate and the piston allowing the piston to be cooler than the pressure plate and reducing thermal transfer to the fluid.

17. The rotational control apparatus of claim 16 wherein the drive disc includes a ventilated hub comprising, in combination: a generally cylindrical portion havihg a first end, a second end, and an exterior; axially extending air cooling bores extending through the cylindrical portion between its first and second ends and within its exterior; axially extending fins extending from the second end of the cylindrical portion and located between and out of circumferential alignment with the axially extending air cooling bores, with the cooling air passing through the cooling bores of the hub internally of the apparatus housing for passage through, around, and between the axially extending, circumferentially spaced fins of the interconnecting and thermally insulating means with the drive disc extending radialy from the exterior of the generally cylindrical portion for rotation therewith.

18. The rotational control apparatus of claim 17 wherein the drive disc further includes internal heat radiating fins, with the heat radiating finned drive disc comprising a first, individual component disc; a second, individual component disc; means for interconnecting the first and second component discs together to form the drive disc, with the heat radiating fins extending generally longitudinally between the internal surfaces of the component discs and internally of the drive disc, with the heat radiating fins extending radially in a circumferentially spaced relation throughout the circumference of the drive disc to thus divide the drive disc into wedge shaped areas, at least one cooling air entry port formed through the spaced component discs adjacent its center and being formed in the wedge shaped areas, with the heat radiating fins including at least three columns in a spaced relation forming fin openings therebetween to define an air cooling chamber internally of the drive disc, between the air entry port, through the fin openings of the heat radiating fins, and out of the periphery of the drive disc to allow a serpentine path and passage of cooling air radially and also circumferentially inside the drive disc to allow increased heat transfer, cooling, and device efficiency.

19. The rotational control apparatus of claim 16 wherein the piston and the piston cavity are annular shaped, with the piston having a radial inward edge and a radial outward edge, with the piston cavity having a radial inward edge and a radial outward edge; means for sealing between the radial inward edge of the piston and the radial inward edge of the piston cavity; means for sealing between the radial outward edge of the piston and the radial outward edge of the piston cavity; wherein the piston is L-shaped and comprises, in combination: a main body portion and an axially extending leg portion integrally secured thereto, with the main body portion including a radial inward edge having a diameter and with the axially extending leg portion including a radial inward edge having a diameter, with the diameters of the radial inward edges of the main body portion and the leg portion being equal, with the radial inward edge of the main body portion being contiguous and coaxial with the radial inward edge of the leg portion forming the radial inward edge of the piston, with the means for sealing the radial inward edges of the piston and the piston cavity engaging with the radial inward edge of the leg portion when the piston is biased by the biasing means within the piston cavity and engaging with the radial inward edge of the main body portion when the piston is reciprocated in the cavity by the fluid pressure.

20. The rotational control apparatus of claim 17 wherein the ventilated hub includes a first end and a second end, with the generally cylindrical portion being axially spaced from the second end of the ventilated hub; with the axially extending fins extending from the second end of the cylindrical portion to the second end of the ventilated hub, with the radial extent of the axially extending fins being less than the radial extent of the cylindrical portion, with the radial extent of the axially extending fins decreasing from the second end of the cylindrical portion to the second end of the ventilated hub.

21. The rotational control apparatus of claim 20 wherein the generally cylindrical portion is axially spaced from the first end of the ventilated hub; and wherein the ventilated hub further includes second, axially extending fins extending from the first end of the cylindrical portion to the first end of the ventilated hub.

22. The rotational control apparatus of claim 20 wherein the ventilated hub further comprises, in combination: an axially extending bore for receipt of a shaft to be rotatably controlled; axially extending shoulders extending from the second end of the cylindrical portion to the second end of the ventilated hub, with the radial extent of the axially extending shoulders being less than the radial extent of the cylindrical portion, with the radial extent of the axially extending shoulders decreasing from the second end of the cylindrical portion to the second end of the ventilated hub, with the thickness of the shoulders decreasing along their axial length from the second end of the ventilated hub, with the thickness of the shoulders decreasing along their axial length from the second end of the cylindrical portion to the second end of the ventilating hub; and set screws threadably received in the shoulders for radially abutting with the shaft received in the axial bore of the ventilated hub, with the shoulders located between and out of circumferential alignment with the axially extending cooling bores, with the axially extending shoulders increasing the surface cooling area to increase the cooling efficiency of the ventilated hub add the rotational oontrol apparatus.

23. The rotational control apparatus of claim 17 wherein the axially extending cooling bores of the ventilated hub have a radial size which increases over their axial length from the first end to the second end of the generally cylindrical portion.

24. The rotational control apparatus of claim 17 further comprising, in comhination: means for slideably mounting the drive disc on the exterior of the generally cylindrical portion of the ventilated hub comprising, in combination: splines formed on the exterior of the generally cylindrical portion of the ventilated hub, with the drive disc having an inner circumference, and splines formed on the inner circumference of the drive disc complementary to and for slideable receipt on the splines of the ventilated hub.

* * * * *

UNITED STATES PATENT OFFICE
CERTIFICATE OF CORRECTION

Patent No. 4,576,266          Dated March 18, 1986

Inventor(s) Hugh K. Schilling, Leonid Dayen, and Charles D. Raines

It is certified that error appears in the above-identified patent and that said Letters Patent are hereby corrected as shown below:

Under U.S. PATENT DOCUMENTS of References Cited, the following should be added:

```
--2,675,106   4/1954    Foster. . . . . . .192/113.1
  2,827,142   3/1958    Auchauer. . . . . .192/70.12--.
```

Under FOREIGN PATENT DOCUMENTS of References Cited, the following should be added:

```
--0082786    3/1983    Europe .
  0109035    5/1984    Europe .
  1202904    8/1970    United Kingdom .
  2142103    1/1985    United Kingdom .--.
```

Column 14, line 4, cancel "add" and substitute therefor --and--.

Column 14, line 5, cancel "oontrol" and substitute therefor --control--.

Signed and Sealed this

Seventeenth Day of June 1986

[SEAL]

Attest:

DONALD J. QUIGG

Attesting Officer        Commissioner of Patents and Trademarks